F. E. HALL.
Hose-Pipe Nozzles.
No. 141,787.  Patented August 12, 1873.
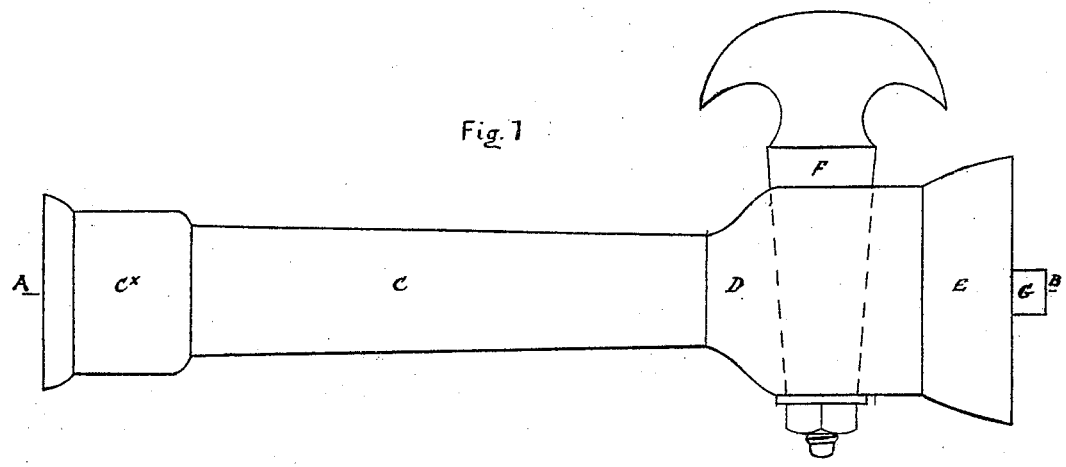
Fig. 1
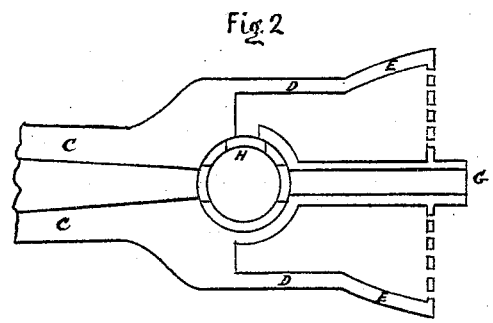
Fig. 2
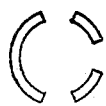 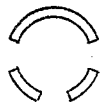 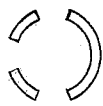 
Fig. 3    Fig. 4    Fig. 5    Fig. 6.
Witnesses.
Lemuel P. Jenks.
Wm. L. Arnaud
Inventor.
Frank Elmer Hall

UNITED STATES PATENT OFFICE.

FRANK E. HALL, OF BOSTON, MASSACHUSETTS.

IMPROVEMENT IN HOSE-PIPE NOZZLES.

Specification forming part of Letters Patent No. 141,787, dated August 12, 1873; application filed July 16, 1873.

*To all whom it may concern:*

Be it known that I, FRANK ELMER HALL, of Boston, in the county of Suffolk and State of Massachusetts, have invented an Improved Hose-Pipe Nozzle, of which the following is a specification:

The nature of my invention is that of a hose-pipe nozzle so constructed and furnished with a plug so made as that the character of the streams of water emitted may be at pleasure changed; and the object is to throw, at pleasure, one large solid stream of water, or, instead thereof, several small streams, or both the large stream and the small stream at the same time.

Figure 1 is a side view of my nozzle. Fig. 2 is a horizontal section of the eduction end of the same in the line A B in Fig. 1. Figs. 3, 4, 5, and 6 are horizontal sections of the plug on the line A B in Fig. 1, and are hereinafter more particularly explained.

In the drawings, C, Fig. 1, (C C, Fig. 2,) is the main body of the nozzle, being a pipe furnished at the left-hand end in Fig. 1 with an enlargement, $C^x$, in the shape of a hollow cylinder, which bears inside a hollow screw. At the right-hand end in Fig. 1 it also bears attached a hollow cylinder, D, Fig. 1, (D D, Fig. 2,) with its axial line coincident with that of the pipe C. This cylinder D is called the induction-chamber, and bears attached to its right-hand end a chamber, E, Fig. 1, (E E, Fig. 2,) called the eduction-chamber, in the shape of a frustum of a hollow cone, with its base to the extreme right, its sides being slightly rounded. (Except for purposes of reference, these two chambers may be considered, and are, a single chamber.) This induction-chamber D D is seen in Fig. 2 to be furnished with an inner wall, formed into (in horizontal section, Fig. 2) the shape of a ring. In Fig. 1 (see dotted lines) it is seen that the area inside of this sectional ring is a portion of an aperture, conical in shape, passing through the cylinder D, at right angles to it, from one side to the other, and bearing the plug F, Fig. 1, with the usual thumb-piece above and washer and nut below. In Fig. 2 it is seen that the bore of the nozzle leads through an aperture into the bore for the plug F, and a corresponding aperture on the opposite side of the plug-bore bears a small pipe, G, Figs. 1 and 2, firmly fastened to it, which pipe, called the eduction-pipe, (whose axis is coincident with that of the bore of the main pipe C,) proceeds through both the induction-chamber D and the eduction-chamber E, a short distance beyond the outer boundary of the latter, at the right in Figs. 1 and 2. The plug-bore (see Fig. 2) has also, at H, an aperture in its side (on the further side in Fig. 1) at its center, which is called the sprinkler-aperture, and communicates with the interior of the induction-chamber D, and thus with the eduction-chamber E. This latter chamber is closed at its extreme end on the right by a metallic plate, perforated like the rose of a watering-pot, through the center of which the eduction-pipe G passes. I sometimes scatter and divide my stream in other ways—say, by having a narrow circular slit in the plate of the chamber E near the periphery.

Figs. 3, 4, 5, and 6 show the location of different holes in the plug F. Fig. 3 is a view in horizontal section of the plug in a position in which it closes the nozzle-bore, thus stopping all flow of the water. Fig. 4 is a view of the same in a position in which it closes the sprinkler-aperture at H, but leaves uninterrupted the flow of water through the body of the nozzle C and through the eduction-pipe G. Fig. 5 is a sectional view of the plug F, in which the induction-aperture of the nozzle-bore is open and only the sprinkler-aperture also open. Fig. 6 shows the nozzle-bore, the sprinkler-aperture, and the eduction-pipe aperture all open at once.

The nozzle being screwed to a hose and the water let on I, by means of the thumb-piece of the plug, turn it to the position shown in Fig. 3, when the stream of water is stopped. Turning in the same manner the plug to the position shown in Fig. 4, there proceeds from the eduction-pipe G one large and solid stream of water. Turning the plug to the position shown in Fig. 5, the solid stream ceases, and is succeeded by a number of small streams from the perforations at the right, seen in Fig. 2. Turning the plug to the position seen in Fig. 6, I have a number of small streams with, at the same time, a large solid stream in the center of them. The advantages of this last arrangement are numerous. Among them may be mentioned that, with steam fire-engines, it gives me a spread of water immediately around the hose-operator, while the large stream does not scatter till it has reached a much more distant point, and thus, both near and far off, the fire is quelled.

In washing vehicles and windows, &c., my strong solid stream loosens and detaches the mud, while the smaller ones wash it away, thus greatly facilitating and expediting the labor. In watering gardens the same expedition and facility is afforded by the peculiar action of my device.

I do not claim any device by which a large solid stream is thrown alternately with a scattered stream or a number of small streams.

I claim—

The described hose-pipe nozzle, having, in combination with the nozzle-pipe C, perforated chamber D E and eduction-pipe G, the three-way cock F, having its outlets all arranged in the same annular or circumferential line, and in relation to passages leading to the pipe G and chamber D E, as set forth, whereby the water may be thrown at the same time both from the sprinkler and from the tube, as well as from either alone.

FRANK ELMER HALL.

Witnesses:
LEMUEL P. JENKS,
WM. S. ARNAUD.